Patented July 2, 1940

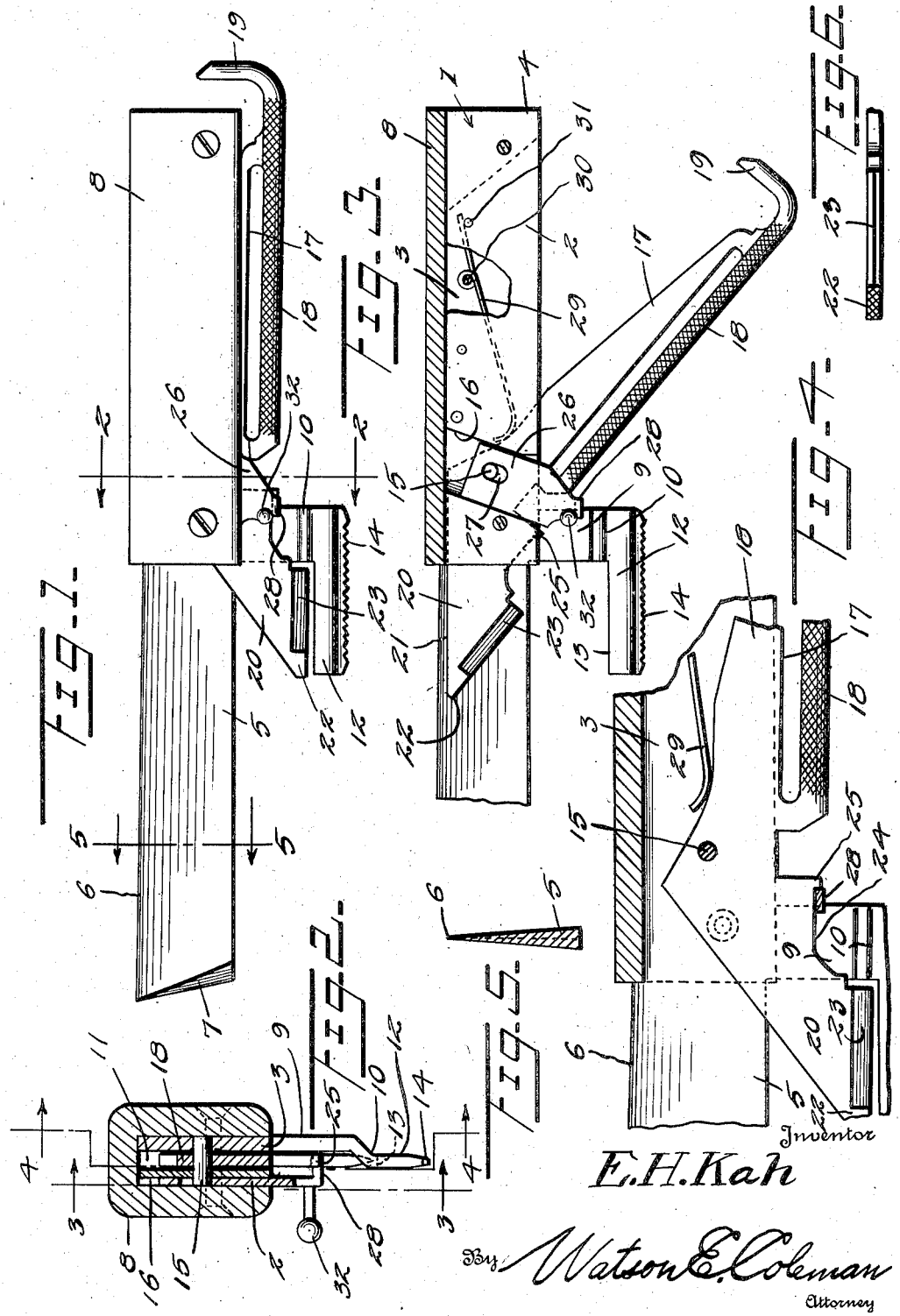

2,206,257

UNITED STATES PATENT OFFICE 2,206,257

SPORTSMAN'S KNIFE

Elmer H. Kah, Sidney, Ohio, assignor of one-third to Robert W. Turner, Port Jefferson, Ohio, and one-third to Sylvester L. Barnett, Allen County, Ohio Application November 26, 1938, Serial No. 242,580

10 Claims. (Cl. 30—142)

This invention relates to improvements in cutlery and pertains particularly to an improved sportsman's knife.

The present invention has for its primary object to provide a knife designed especially for the use of sportsmen, in which there is provided a novel cutting and gripping unit which is particularly suitable for severing bones and for gripping small objects which it might be desired to hold firmly.

Another object of the invention is to provide in a combined knife, bone cutter and gripping device, a novel means for securing the cutting and gripping device in inoperative position.

Still another object of the invention is to provide in a device of the character described, a novel cutting device in which a portion of one fixed element of the same is formed for use as a fish scaler.

The invention will be best understood from a consideration of the following detailed description taken in connection with the accompanying drawing forming part of this specification, with the understanding, however, that the invention is not to be confined to any strict conformity with the showing of the drawing but may be changed or modified so long as such changes or modifications mark no material departure from the salient features of the invention as expressed in the appended claims.

In the drawing:

Fig. 1 is a view in side elevation of the implement embodying the present invention.

Fig. 2 is a sectional view on the line 2—2 of Fig. 1.

Fig. 3 is a sectional view taken longitudinally of the handle portion of the knife on the line 3—3 of Fig. 2.

Fig. 4 is a longitudinal section on the line 4—4 of Fig. 2, this section being confined to the forward end portion of the handle.

Fig. 5 is a sectional view on the line 5—5 of Fig. 1.

Fig. 6 is a view looking toward the edge of the cutting blade of the bone cutter.

Referring now more particularly to the drawing, the numeral 1 generally designates the metal body portion of the knife which is formed of two plate members 2 and 3, which are joined together at one end to form the butt 4 of the knife handle. One of these plate members here illustrated as the plate 3, is extended to form the integral blade 5 having the longitudinal cutting edge 6 and having its forward end obliquely cut and sharpened to form an oblique transverse cutting edge 7.

The plates 2 and 3 are housed within the wooden handle 8 which is of one-piece construction as shown in Fig. 2, being extended across the under edge of the body 1 or that edge which lies nearest to the cutting edge 6 of the blade. The wooden handle is open along the opposite or top edge which is the edge which is directed upwardly when the blade is being used.

Formed integrally with the plate 3 of which the blade 5 forms an integral extension, at the edge of the plate adjacent the back of the blade and at the forward end of the handle portion of the knife, is the angularly extending flat arm 9, which adjacent its outer end is laterally offset, as indicated at 10, so that the terminal portion will be brought into the plane of the space 11 which is formed between the plates 2 and 3, and this terminal portion of the arm is integral with the forwardly extending blade 12, the edge of this blade, which is directed toward the back of the knife, being flat, as indicated at 13, Fig. 2, to form a cutting anvil for the bone cutter hereinafter described. The opposite edge of the blade 12 is sharpened slightly and provided with teeth 14. This toothed edge of the blade 12 is provided for use as a fish scaler.

Extending through the plates 2 and 3 just to the rear of the arm 9 is a pin 15 and this pin extends into the central portion of a recess 16 which is formed across the face of the plate 2 on an oblique line, the recess having its forward end nearest the arm 9.

The pin 15 serves two purposes, one of which is to provide a pivot for an oscillatable lever 17 which is normally housed in the area between the plates 2 and 3, and which has secured to and extending along its outer edge, the bar 18 which terminates in the laterally extending end portion 19 which, when the lever is within the area between the plates 2 and 3, extends across the butt end of the handle.

The forward end of the lever 17 is formed integral with the obliquely extending blade 20, the back edge 21 of which moves into a position parallel with the edge 6 of the knife blade 5 when the lever is swung to fully opened position. When the lever is in this opened position, the inner end of the straight back edge 21 of the blade 20 abuts against the inner side of the wooden handle 8 so that its further oscillatory movement is limited by this part of the handle.

The forward end of the blade 20 is cut to form an acute angle with the back edge 21 so that these two edges form a point and this acutely angled edge has a flat surface 22 adjacent the point of the blade which serves as a jaw which is adapted to be brought into contact with the flat edge 13 of the blade 12 to provide a gripping means and the major portion of the angled edge of the blade is sharpened to form a cutting edge 23 which is also brought into contact with the flat edge 13 of the blade 12 when the lever is swung into the position in which it is shown in Fig. 1.

Adjacent the inner end of the blade edge 23 there is formed a shoulder 24 which is inset from the edge 23 and which terminates at the end remote from the cutting edge 23 in the stop lug 25.

Slidably disposed within the recess 16 is a latch plate 26 which has an elongated opening 27 formed therethrough in which the adjacent end of the pivot pin 15 engages. This plate is maintained in position by the adjacent side of the wooden handle 8 and is permitted limited longitudinal movement in the recess by the pivot pin. At its outer end the plate is provided with a laterally extending latch finger 28 which is adapted to be engaged against the shoulder 24 and against the inner side of the stop 25 to thus hold the lever 17 against oscillation, maintaining the blade edge 23 in position adjacent the flat anvil surface of the blade 12. By sliding the latch plate 26 outwardly slightly, the latch finger 28 is removed from engagement against the stop 25 and permits the stop to swing under the finger so that the lever 17 can be oscillated to separate the blades 12 and 20.

The opening movement of the lever 17 is facilitated by a spring member 29 which is housed between the plates 2 and 3 and bears at one end against the under edge of the lever 17 and has its other end secured against movement by the pins 30 and 31, the pin 30 forming a pivot point about which the spring bends.

The movement of the latch plate 26 is effected through the medium of the finger piece 32 which is secured to and extends laterally from the outer end of the latch plate. From the foregoing, it will be readily apparent that the knife embodying the present invention is designed for many purposes as the blade 5 with the cutting transverse end edge 7 may be used in various cutting operations required in the cleaning and cutting up of game and the serrated edge of the blade 12 is conveniently arranged whereby it may be employed for the cleaning or scaling of fish. The cutter formed of the blades 12 and 20 is provided for severing bodies which are too firm or tough to be cut with the knife blade 5, such as bones, sinews and the like, and the flattened nose portion 22 of the blade 20 cooperates with the adjacent end of the blade 12 to provide grippers which may be employed as pliers or a similar implement.

What is claimed is:

1. An implement of the character described, comprising a knife blade having a handle portion, a flat arm integral with and extending from the back edge of said blade adjacent the handle, a fixed blade member integral with the arm and spaced from and extending longitudinally of the back of the first blade, a pivoted blade attached to the handle and having a sharpened edge movable relative to said fixed blade member, and lever means for moving said pivoted blade.

2. An implement of the character described, comprising a knife blade having a handle portion, a flat arm integral with and extending from the back edge of said blade adjacent the handle, a fixed blade member integral with the arm and spaced from and extending longitudinally of the back of the first blade, said arm being offset at its end adjacent the blade member to set said blade member in a plane to one side of the knife blade, a pivoted blade attached to the handle and having a sharpened edge movable relative to said fixed blade member, lever means for moving said pivoted blade, said lever means and pivoted blade being oscillatable in the said plane of the fixed blade member, and latch means for securing said pivoted blade in closed poistion relative to the fixed blade.

3. An implement of the character described, comprising a body made up of two elongated plate members secured in spaced side by side relation, a cutting blade forming an integral continuation of one end of one plate, a flat arm forming a lateral integral part of a plate, a handle body enclosing said plate bodies, said arm extending from the adjacent plate at the forward end of said handle body, a rigid blade integral with the outer end of said arm and extending longitudinally of the first blade in spaced relation with the back edge thereof, said second blade having a flat longitudinal edge surface, an oscillatable blade pivotally attached to a plate and having a cutting edge movable against the flat longitudinal edge of the second-mentioned blade, and a lever forming a part of the last-mentioned blade and oscillatable therewith into and out of the area between said plates.

4. An implement of the character described, comprising a body made up of two elongated plate members secured in spaced side by side relation, a cutting blade forming an integral continuation of one end of one plate, a flat arm forming a lateral integral part of a plate, a handle body enclosing said plate bodies, said arm extending from the adjacent plate at the forward end of said handle body, a rigid blade integral with the outer end of said arm and extending longitudinally of the first blade in spaced relation with the back edge thereof, said second blade having a flat longitudinal edge surface, an oscillatable blade pivotally attached to a plate and having a cutting edge movable against the flat longitudinal edge of the second-mentioned blade, and a lever forming a part of the last-mentioned blade and oscillatable therewith into and out of the area between said plates, the said last-mentioned blade having a portion of the edge thereof flattened to form a jaw for coaction with the flat edge of the second-mentioned blade.

5. An implement of the character described, comprising a pair of elongated flat plates arranged in spaced side by side relation and secured together at one end, a handle body extending lengthwise of and covering the outer sides of the plates and two adjacent longitudinal edges thereof and the area therebetween, the area between the plates being uncovered at the opposite longitudinal edges, an arm extending laterally from the said other edge of one of the plates and terminating in an offset portion, an elongated blade member integral at one end with the offset portion of said arm and extending longitudinally with respect to the plates, a lever adapted to be positioned between the plates through said open area, means pivotally securing one end of the lever to the plates adjacent the inner end of said arm, and a blade forming an extension of the pivoted end of the lever and having a cutting edge movable by the lever with respect to said first blade.

6. An implement of the character described, comprising a pair of elongated flat plates arranged in spaced side by side relation and secured together at one end, a handle body extending lengthwise of and covering the outer sides of the plates and two adjacent longitudinal edges thereof and the area therebetween, the area between the plates being uncovered at the opposite longitudinal edges, an arm extending laterally from the said other end of one of the plates and terminating in an offset portion, an elongated blade member integral at one end with the offset portion of said arm and extending longitudinally with respect to the plates, a lever adapted to be positioned between the plates through said open area, means pivotally securing one end of the lever to the plates adjacent the inner end of said arm, a blade forming an extension of the pivoted end of the lever and having a cutting edge movable by the lever with respect to said first blade, a sliding latch secured to one of said plates, a stop lug carried by the lever blade, and a latch finger carried by said latch plate and engageable against one side of said lug to maintain the lever carried blade against movement.

7. A knife of the character described, comprising a longitudinally recessed elongated handle body, a pair of plates disposed in the recess of said handle in spaced side by side relation and secured together at one end, one of said plates being longitudinally extended at its other end to form a cutting blade having a sharpened longitudinal edge, a lever pivotally secured at one end between said plates and extending from the recess of the handle, a blade integral with the lever adjacent the pivoted end thereof, and a fixed blade arranged in spaced parallel relation with said knife blade and adapted to have the lever carried blade moved thereagainst by oscillation of the lever.

8. A cutting implement of the character described, comprising a longitudinally recessed elongated handle body, a pair of plates secured in said recess in spaced side by side relation, an arm integral with and extending from the edge of one of said plates adjacent one end of the handle and terminating in a laterally offset portion which is disposed in the plane of the area between the plates, an elongated rigid blade secured at one end to said arm and disposed to extend longitudinally with respect to the plates, said blade having a flat edge surface, a lever pivotally mounted at one end between the plates adjacent the arm and having a longitudinal portion permanently disposed outside the area between the plates, and an obliquely directed blade at the pivoted end of said lever and carried thereby and having a sharpened edge portion adapted to be moved into engagement with the flat edge of said fixed blade.

9. A cutting implement of the character described, comprising a longitudinally recessed elongated handle body, a pair of plates secured in said recess in spaced side by side relation, an arm integral with and extending from the edge of one of said plates adjacent one end of the handle and terminating in a laterally offset portion which is disposed in the plane of the area between the plates, an elongated rigid blade secured at one end to said arm and disposed to extend longitudinally with respect to the plates, said blade having a flat edge surface, a lever pivotally mounted at one end between the plates adjacent the arm and having a longitudinal portion permanently disposed outside the area between the plates, an obliquely directed blade at the pivoted end of said lever and carried thereby and having a sharpened edge portion adapted to be moved into engagement with the flat edge of said fixed blade, a latch plate secured to and having limited sliding movement transversely of one of said plates and having an end extending beyond the edges of the plates adjacent said arm, a finger extending laterally from the said end of the latch plate, and means for engaging said finger with said obliquely directed blade when the latter is in closed position for securing it against movement.

10. A cutting implement of the character described, comprising a longitudinally recessed elongated handle body, a pair of plates secured in said recess in spaced side by side relation, an arm integral with and extending from the edge of one of said plates adjacent one end of the handle and terminating in a laterally offset portion which is disposed in the plane of the area between the plates, an elongated rigid blade secured at one end to said arm and disposed to extend longitudinally with respect to the plates, said blade having a flat edge surface, a lever pivotally mounted at one end between the plates adjacent the arm and having a longitudinal portion permanently disposed outside the area between the plates, and an obliquely directed blade at the pivoted end of said lever and carried thereby and having a sharpened edge portion adapted to be moved into engagement with the flat edge of said fixed blade, said fixed blade having the opposite longitudinal edge sharpened and serrated.

ELMER H. KAH.